O. O. WAGLEY.
WATER METER.
APPLICATION FILED NOV. 11, 1911.
1,109,804.
Patented Sept. 8, 1914.
2 SHEETS—SHEET 2
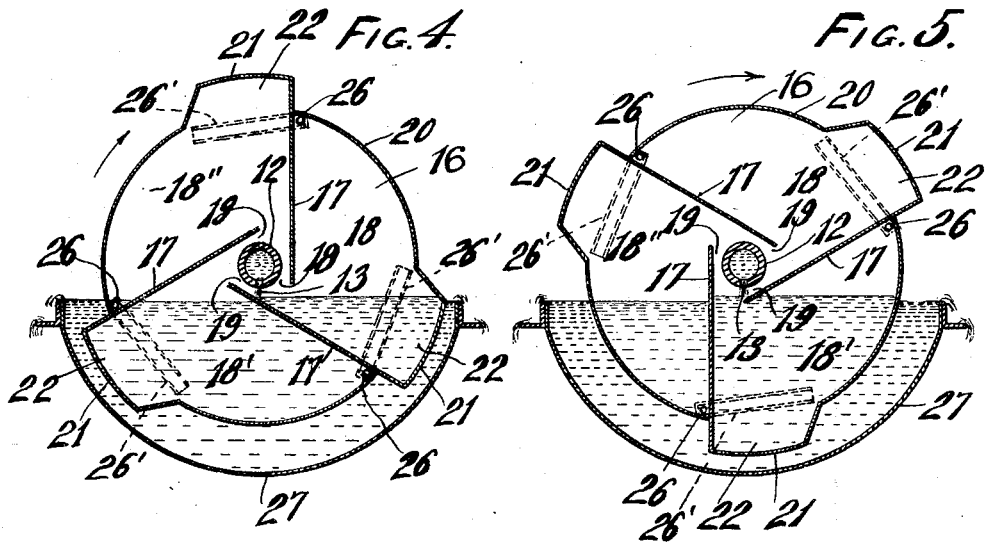
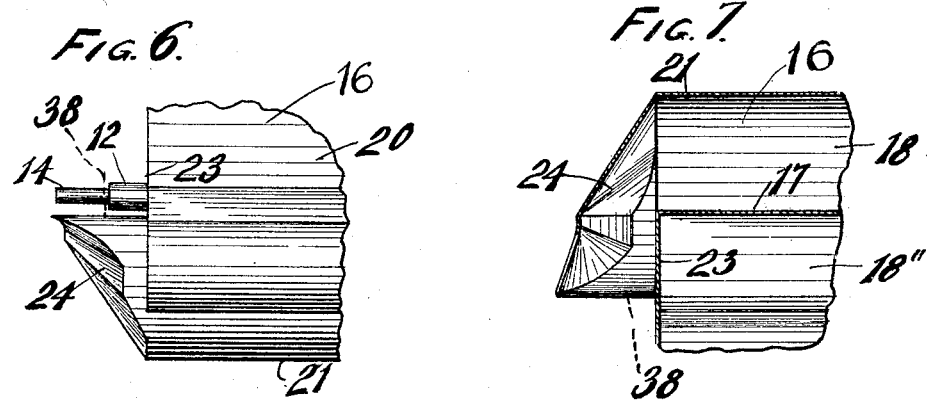
WITNESSES
INVENTOR.
Oswal O. Wagley,
By Morsell & Caldwell
ATTORNEYS.

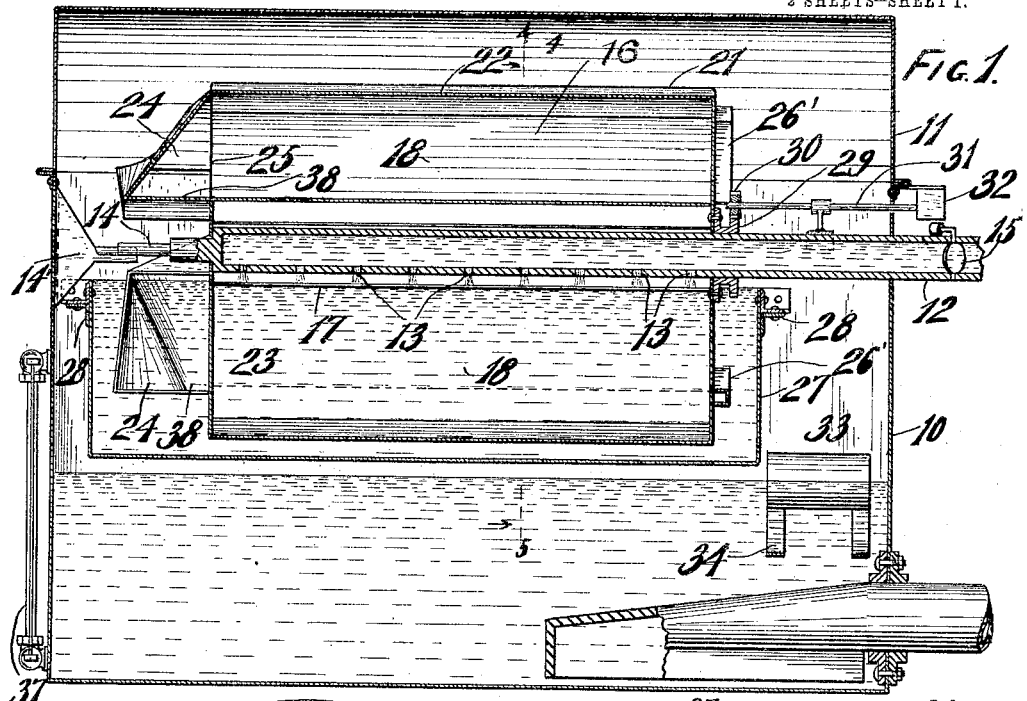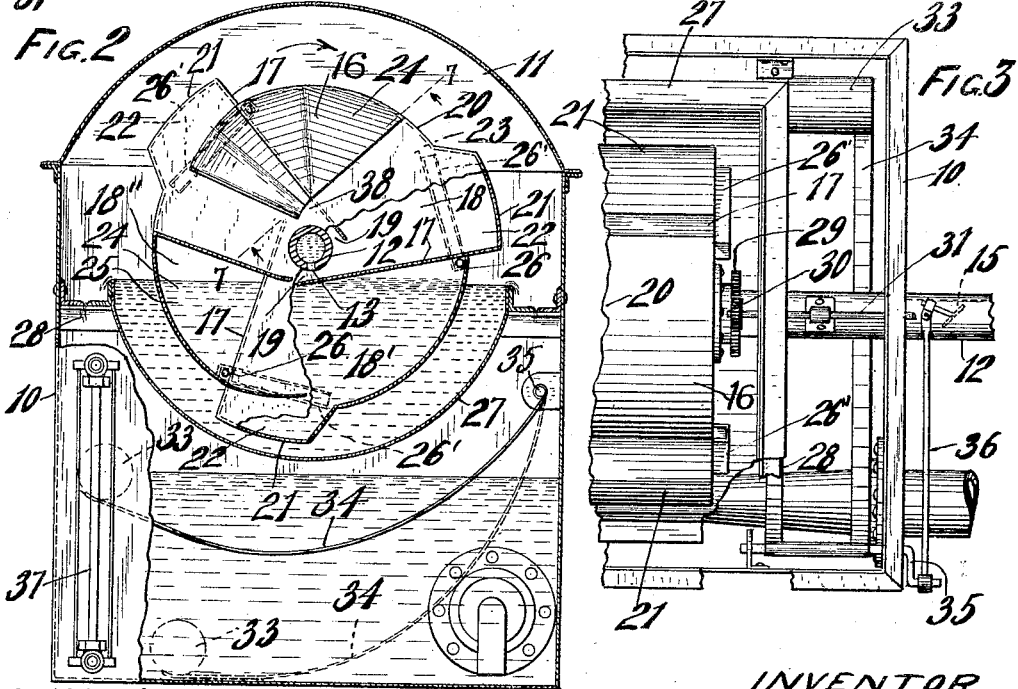

UNITED STATES PATENT OFFICE.

OSWAL O. WAGLEY, OF MILWAUKEE, WISCONSIN.

WATER-METER.

1,109,804.	Specification of Letters Patent.	Patented Sept. 8, 1914.

Application filed November 11, 1911. Serial No. 659,674.

*To all whom it may concern:*

Be it known that I, OSWAL O. WAGLEY, a citizen of the United States, and resident of Milwaukee, in the county of Milwaukee and State of Wisconsin, have invented new and useful Improvements in Water-Meters, of which the following is a description, reference being had to the accompanying drawings, which are a part of this specification.

This invention relates to improvements in water meters for accurately measuring water or other liquids in large quantities or volume.

It is one of the objects of this invention to provide a water meter which is adapted to accurately measure the water flowing therethrough and in which the weight of the water actuates the meter.

A further object of the invention is to provide a water meter which is simple in construction and noiseless in operation and which is adapted to permit a continuous flow of water therethrough.

A further object of the invention is to provide a water meter in which means are provided for relieving the rotating parts of the meter of substantially all of the weight of the water being measured.

A further object of the invention is to provide a water meter in which the accuracy of the meter is not affected by the rate of flow of the liquid or variations in friction of the operating parts.

A further object of the invention is to provide a water meter which can be operated on a very small hydrostatic head.

A further object of the invention is to provide a water meter of the drum type in which a pan or receptacle is placed beneath the drum to regulate the movement of the drum and to relieve strains on the drum and its bearings.

A further object of the invention is to provide a water meter of the drum type in which the drum is provided with extensions to maintain a proper torque or turning moment for the drum.

With the above, and other objects in view, the invention consists of the improved water meter and its parts and combination as set forth in the claims and all equivalents thereof.

In the accompanying drawings in which the same reference characters indicate the same parts in all of the views Figure 1 is a longitudinal sectional view of the improved water meter and its supporting tank or receiver; Fig. 2 is an end view thereof with parts broken away and other parts in section; Fig. 3 is a top view of one end of the water meter with the cover of the tank removed; Fig. 4 is a transverse sectional view of the meter drum and pan therebeneath; Fig. 5 is a similar view thereof with the drum in a slightly different position; Fig. 6 is a side view of one end portion of the drum; and Fig. 7 is a sectional view of an end portion of the drum taken on line 7—7 of Fig. 2.

Referring to the drawing the numeral 10 indicates the receiver or tank within which the meter is positioned and supported. This tank is of rectangular form and is provided with a cover 11 which may be removed to inspect the meter when desired. An inlet pipe 12 projecting through the upper portion of one end of the tank and extending within the tank to the opposite end thereof is provided with a line of perforations 13 along its lower portion and through which the water is discharged. The inner end 14 of the pipe is reduced in diameter and this reduced end is supported on the bracket 14' projecting inwardly from the opposite end of the tank. A butterfly valve 15 controls the flow of water through the pipe from a source of supply.

A drum 16 preferably formed of sheet metal is journaled on the inlet pipe and extends over the line of perforations and is adapted to receive the water or other liquid discharged from said line of perforations. The drum is divided longitudinally and tangentially by partitions 17 into three similar compartments 18, 18' and 18" which are in communication with each other at points 19 close to the inlet pipe 12. These partitions project beyond the periphery 20 of the drum and portions 21 of the drum are extended to meet said projecting portions to form extension compartments 22. These extension compartments serve to overbalance the drum on one side when filled in successive order and exert the necessary torque to cause the rotation of the drum and emptying of the water from the filled compartments. The discharge end 23 of the drum is provided with a pocket 24 for each compartment and the compartments open into their respective pockets through openings 25 in the discharge end 23 of the drum. These pockets open in a direction opposite to the direction of rotation so that when each pocket is filled in successive order and is being carried upwardly by the rotation of the drum the liquid will begin to flow from the respective compartment into the pocket and be discharged through the opening thereof.

The pockets are so proportioned and shaped that the combined area of a filled compartment and its respective pocket, when measured below the horizontal plane of the inner edge of the partition dividing it from the adjacent compartment being filled, remains practically equal to that of the adjacent compartment throughout the rotation of the drum between the filling and the emptying positions of this particular adjacent compartment.

In order to prevent the formation of air pockets within the compartments each pocket is provided with an air vent 26 which extends through the inlet end wall of the drum at the highest points when the compartments are being filled, and a tube 26' covering the air vent extends in a direction receding from the direction of rotation of the drum to prevent the discharge of the liquid from the compartments before the proper discharging position has been reached.

A pan or receptacle 27 positioned within the tank and immediately beneath the drum has its upper edge substantially in horizontal alinement with the plane of the partitions 17 when said partitions are in their lower horizontal positions. The pan 27 is adapted to receive the liquid discharged from the compartments of the drum and to in turn discharge the liquid by permitting it to overflow over the edge of said pan thus providing for keeping approximately one half of the drum beneath the surface of the liquid. As the liquid within the compartments is substantially at the same level or a trifle higher, depending upon the amount of friction necessary to be overcome, the drum will be relieved of the weight of the liquid within the compartments. The inner edges of the partitions in revolving around the inlet pipe, a slight distance, from the filling position toward the discharging position, will rise to the surface and separate an exactly filled compartment from one being filled. The variations in friction and all other factors which could change levels in the compartment being filled can only slightly alter the point in the rotation in which the liquid in a filled compartment is separated from the liquid of the compartment being filled but cannot alter the extent to which it is filled. As the filled compartment with its outlet pocket holds the same volume of liquid, whatever its position between its filled position and its position of emptying, the volume measured during each revolution will not be varied by changes in rate of flow, in bearing friction or other irregularities. The pan is supported on angle iron supporting members 28 which extend across the tank from one side to the other and are fastened thereto. The inlet end of the drum is provided with a gear 29 which meshes with a pinion 30 mounted on a shaft 31 extending through the end of the tank. The outer end of this shaft is adapted to be connected to a registering device 32 to indicate the number of revolutions of the drum and as the volume of liquid each compartment will hold is a known factor the amount passing through the meter may be easily determined. In order to regulate automatically the flow of liquid through the meter a float 33 is positioned within the tank 10 and is carried on the free end of a float lever 34 which is pivoted to the side of the tank. The pivotal rod 35 of this lever extends through one wall of the tank and is formed with a crank on its outer end portion which is connected to the arm of the butterfly valve 15 by means of the connecting rod 36 so that as the liquid within the tank increases in height the valve in the supply pipe will be turned to retard the flow from the source of supply. A gage 37 connected to the tank indicates the height of liquid within the tank. To give the meter the largest possible capacity, or in other words to give these discharge pockets the largest possible throat openings without departing from the correct proportion as to volume, the throats of the pockets are made broader nearest to the shaft and in a line parallel thereto, as indicated by the numeral 38, and narrowing radially in the other direction. This formation maintains a proper liquid level with relation to the partitions without disturbing the center of gravity of the filled compartments.

In operation assuming that the pan is filled with liquid and the portions of the compartments which are below the surface of the liquid are also filled, the fluid entering through the inlet pipe and entering the compartment 18 through the perforations when said compartment is in the position shown in Fig. 4 will slowly fill said compartment and when the liquid begins to rise above the level of the liquid within the pan the drum will become unbalanced and the excess weight of the liquid in the compartment being filled will cause the drum to revolve slowly. The extension compartments serve to give additional torque at the correct times to overcome frictions and make the movement positive. The drum in turning will carry the upper edge of the lower partition of the compartment being filled above the surface of the liquid in the pan so that the liquid cannot discharge over this edge and as the discharge mouth of the pocket of the said compartment is above the horizontal plane of the upper partition of the compartment the liquid cannot be discharged therethrough until this upper partition has moved below its horizontal position. The compartment in moving below its horizontal plane will position the next succeeding compartment beneath the discharge apertures of the inlet pipe and it in turn will be filled and cause the further rotation of the drum. As the filled compartments are swung upwardly the liquid will be discharged through the pocket openings. As the liquid is emptied into the pan it will flow over the edges thereof into the tank and from the tank it will be discharged through the discharge pipe extending from said tank. If the flow of liquid into the tank is greater than the discharge thereof the float will rise and by means of the butterfly valve reduce the supply to the drum until a point is reached when the supply is the same as the discharge.

From the foregoing description it will be seen that the water meter is simple in construction and operation and is well adapted for the purpose desired.

It is to be understood that the invention is not limited to any specific form or arrangement of parts except in so far as such limitations are specified in the claims.

What I claim as my invention is:

1. A water meter, comprising a drum having a plurality of tangentially positioned partitions dividing the drum into a plurality of compartments in communication with each other near the axis of rotation of the drum and also having a discharge opening for each compartment, extension compartments projecting from the periphery of the drum and a supply pipe for successively feeding liquid to said compartments and said liquid adapted to cause the rotation of said drum and to be discharged through the discharge openings thereof.

2. A water meter, comprising a constant liquid level receptacle, a drum partly positioned within the receptacle and having a plurality of tangentially positioned partitions dividing the drum into a plurality of compartments in communication with each other near the axis of rotation of the drum and also having a discharge opening for each compartment, and a supply pipe for successively feeding liquid to said compartments and said liquid adapted to cause the rotation of said drum and to be discharged through the discharge openings thereof, said receptacle supporting the weight of the liquid within the drum and arranged to maintain a constant liquid level.

3. A water meter, comprising a constant liquid level receptacle, a drum partly positioned within the receptacle and provided with a plurality of compartments having outlet openings for discharging a liquid therefrom into the receptacle, said receptacle arranged to discharge the liquid in excess of a fixed level, and an inlet pipe extending into the drum for successively feeding a liquid to the compartments, said liquid causing the rotation of the drum.

4. A water meter, comprising a constant liquid level receptacle, a drum partly positioned within the receptacle and provided with a plurality of compartments having outlet openings and said compartments also being in communication with each other near the axis of rotation of the drum, and an inlet pipe extending into the drum and around which the drum rotates, said inlet pipe provided with apertures for successively feeding a liquid to the compartments and the compartments in turn discharging the liquid into the receptacle, the said receptacle supporting substantially all of the weight of the liquid within the compartments arranged to maintain a constant liquid level.

5. A water meter, comprising a constant liquid level receptacle, said receptacle arranged to maintain a constant liquid level, a perforated tube extending horizontally above the receptacle, a drum journaled on the tube and extending into the receptacle, and tangential partitions positioned within the drum and dividing the drum into a plurality of compartments which are in communication with each other near the axis of rotation of the drum and which are adapted to be successively filled from the perforated tube, said drum provided with a discharge opening for each compartment, and pockets covering the discharge opening, and having their respective openings opening in a direction opposite to the direction of rotation of the drum and positioned circumferentially a distance beyond the drum openings.

6. A water meter, comprising a receptacle, a perforated tube extending horizontally above the receptacle, a drum journaled on the tube and extending into the receptacle, tangential partitions positioned within the drum and dividing the drum into a plurality of compartments which are in communication with each other near the axis of rotation of the drum and which are adapted to be successively filled from the perforated tube, said drum also being provided with extension compartments projecting from the periphery of the drum and which are in communication with the other compartments, said drum being provided with a discharge opening for each compartment, and pockets covering the discharge openings and having their respective openings opening in a direction opposite to the direction of rotation of the drum and positioned circumferentially a distance beyond the drum openings.

7. A water meter, comprising a receptacle, a perforated tube extending horizontally above the receptacle, a drum journaled on the tube and extending into the receptacle, and tangential partitions positioned within the drum and dividing the drum into a plurality of compartments which are in communication with each other near the axis of rotation of the drum and which are adapted to be successively filled from the perforated tube, said drum also being provided with extension compartments projecting from the periphery of the drum and which are in communication with the other compartments, said drum being provided with a discharge opening for each compartment, and pockets covering the discharge openings and having their respective openings opening in a direction opposite to the direction of rotation of the drum and positioned circumferentially a distance beyond the drum openings, said pocket openings being greater in area at a point adjacent to the perforated pipe than at a point adjacent to the periphery of the drum.

8. A water meter, comprising a receptacle, a perforated tube extending horizontally above the receptacle, a drum journaled on the tube and having its lower portion extending into the receptacle, tangential partitions within the drum and having their inner end portions extending adjacent to the perforated tube and beneath the tube when said partitions are in their lowermost horizontal positions, said partitions dividing the drum into a plurality of compartments, said drum having discharge openings for said compartments provided on one end, pockets covering the discharge openings and having their respective openings opening in a direction opposite to the direction of rotation of the drum and positioned circumferentially a distance beyond the drum openings, said pocket openings being greater in area at a point adjacent to the tube than at a point adjacent to the periphery of the drum.

9. A water meter, comprising a tank provided with a discharge opening, a receptacle positioned in the upper portion of the tank, a perforated inlet pipe extending horizontally above the receptacle, a valve controlling the fluid passing through said pipe, a float within the tank, a connection between the float and the valve to control the supply of fluid with relation to the discharge of fluid from the tank, a drum journaled on the tube and having its lower portion extending into the receptacle, tangential partitions within the drum and having their inner end portions extending adjacent to the perforated tube and beneath the tube when said partitions are in their lowermost horizontal positions, said partitions dividing the drum into a plurality of compartments, said drum having discharge openings for said compartments provided on one end, and pockets covering the discharge openings and having their respective openings opening in a direction opposite to the direction of rotation of the drum and positioned circumferentially a distance beyond the drum openings, said pocket openings being greater in area at a point adjacent to the tube than at a point adjacent to the periphery of the drum.

10. A water meter, comprising a tank provided with a discharge opening, a receptacle positioned in the upper portion of the tank, a perforated inlet pipe extending horizontally above the receptacle, a valve controlling the fluid passing through said pipe, a float within the tank, a connection between the float and the valve to control the supply of fluid with relation to the discharge of fluid from the tank, a drum journaled on the tube and having its lower portion extending into the receptacle, tangential partitions within the drum and having their inner end portions extending adjacent to the perforated tube and beneath the tube when said partitions are in their lowermost horizontal positions, said partitions dividing the drum into a plurality of compartments, said drum also being provided with extension compartments projecting from the periphery of the drum and which are in communication with the other compartments, said drum having discharge openings for said compartments provided on one end, and pockets covering the discharge openings and having their respective openings opening in a direction opposite to the direction of rotation of the drum and positioned circumferentially a distance beyond the drum openings, said pocket openings being greater in area at a point adjacent to the tube than at a point adjacent to the periphery of the drum.

11. A water meter, comprising a receptacle, a drum partly positioned within the receptacle and having a plurality of tangentially positioned partitions dividing the drum into a plurality of compartments and also having an extension compartment for each compartment, said partitions when in their lower horizontal positions being in approximately the same horizontal plane as the upper edge of the receptacle, said drum at one end also being provided with a discharge opening for each compartment, and pockets positioned on one end of the drum and covering the end discharge openings and having their respective openings opening in a direction opposite to the direction of rotion of the drum and positioned circumferentially a distance beyond the drum openings.

In testimony whereof, I affix my signature, in presence of two witnesses.

OSWAL O. WAGLEY.

Witnesses:
C. H. KEENEY,
KATHERINE HOLT.

Copies of this patent may be obtained for five cents each, by addressing the "Commissioner of Patents, Washington, D. C."